United States Patent [19]

Jones et al.

[11] 3,905,473

[45] Sept. 16, 1975

[54] DRIVE APPARATUS
[75] Inventors: Robert D. Jones; Jerry L. Hall, both of Oskaloosa, Iowa
[73] Assignee: Intraco, Inc., Oskaloosa, Iowa
[22] Filed: Jan. 21, 1974
[21] Appl. No.: 434,768

[52] U.S. Cl. ... 198/208; 74/242.11 A; 74/242.13 A; 198/168; 198/203; 198/232
[51] Int. Cl.² ........................................ B65G 15/30
[58] Field of Search ........... 198/208, 232, 168, 203; 74/242.11 A, 242.13 A

[56] References Cited
UNITED STATES PATENTS

| | | | |
|---|---|---|---|
| 1,878,983 | 9/1932 | Harris | 74/242.13 A |
| 2,738,765 | 3/1956 | Hart | 198/168 |
| 2,794,538 | 6/1957 | Schenk | 198/208 |
| 2,995,109 | 8/1961 | Cordis | 198/168 |
| 3,058,571 | 10/1962 | Emrick | 198/168 |
| 3,534,634 | 10/1970 | Kawanami | 74/242.13 A |

Primary Examiner—Evon C. Blunk
Assistant Examiner—Jeffrey V. Nase
Attorney, Agent, or Firm—Henderson & Strom

[57] ABSTRACT

A closed conveyor transport system having a tube leading to and from a drive apparatus for a cable. A cable having evenly spaced discs thereon is disposed in the tube and is driven by the drive apparatus. A cable tightening arrangement is associated with the drive apparatus and has a mechanism for automatically tightening the cable. A moveable threaded rod moves the automatic tightening mechanism to provide a manual adjustment for tightening or loosening the cable. A shut-off switch is connected to the cable tightening mechanism which shuts off the drive apparatus when the cable becomes too loose. A tray is provided at the bottom of the drive apparatus to catch material falling therefrom, and the cable adjusting mechanisms are positioned above the tray. A return portion of the cable line is positioned in the tray to carry the material in the tray back into the closed system.

12 Claims, 4 Drawing Figures

PATENTED SEP 16 1975    3,905,473

DRIVE APPARATUS

BACKGROUND OF THE INVENTION

The present invention relates generally to a closed materials handling transport system having a cable with disc-like members rigidly affixed thereto disposed inside of a tube. Movement of the cable moves the material to be handled through the tube since the material is trapped between the discs and the tube; the material normally being granular or powdery material such as livestock feed. The present invention relates more particularly to a drive and cable tension adjusting apparatus for such a closed system.

One of the most critical problems in a materials handling system of this general type is the one of keeping the proper tension upon the cable, since if the cable is too tight or too loose it can cause a malfunction of the system or possibly damage the equipment. One means of making this adjustment is to lengthen or shorten the tube containing the cable to thereby adjust the tension on the cable. This has been done by putting in a proper length of tubing to lengthen the tube or taking out the proper length of tubing to shorten the tube. In doing so, either the cable must be taken apart, since it is a continuous cable, or an insert tube must be used which has an opening in the side thereof which allows the cable to be placed therein and which then allows closing of the insert tube side opening. Other previous mechanisms for maintaining the proper tension in the cable have been used, but have been found to be unduly complicated and not entirely reliable.

Another problem is the one of keeping these adjustment mechanisms and the mechanisms for driving the cable from operating within the material to be handled. If these parts are forced to operate within the material to be handled, they are subject to excessive wear. However, if the adjusting and driving mechanisms are placed outside of the materials to be handled, certain amounts of materials tend to stick to these parts and are dropped outside of the system, where the material can be lost, contaminated or degraded in quality.

SUMMARY OF THE INVENTION

The present invention relates to a cable adjusting mechanism for a closed conveyor transport system including a manual mechanism for large adjustments, and an automatic spring biased pulley mechansim for automatically keeping the cable tight when large tightening adjustments are not needed. A shut-off switch is associated with the automatic spring biased mechanism which shuts off the system when the cable becomes too loose, to thereby prevent malfunctioning of the system and signal the need for a manual tightening adjustment. A tray of a particular configuration is provided to catch materials which have passed through the closed system, including material falling from the drive apparatus and cable adjusting mechanisms.

An object of the present invention is to provide a mechanism for automatically keeping tension on a cable in a cable conveying system.

Another object of the invention is to provide a reliable and economical cable tension adjusting mechanism for large adjustments.

A further object of the invention is to provide a drive apparatus and cable tension adjusting mechanism which does not have moving parts within the material to be handled.

Still another object is to provide a drive apparatus and tension adjusting mechanism for a cable conveyor which does not deposit material outside of the system, but instead recirculates materials dropping from the cable as it passes around the drive apparatus and cable tension adjusting mechanisms.

Other objects, advantages, and novel features of the present invention will become apparent from the following detailed description of the invention when considered in conjunction with the accompanying drawings.

DESCRIPTION OF THE PREFERRED EMBODIMENT

Figure 1:
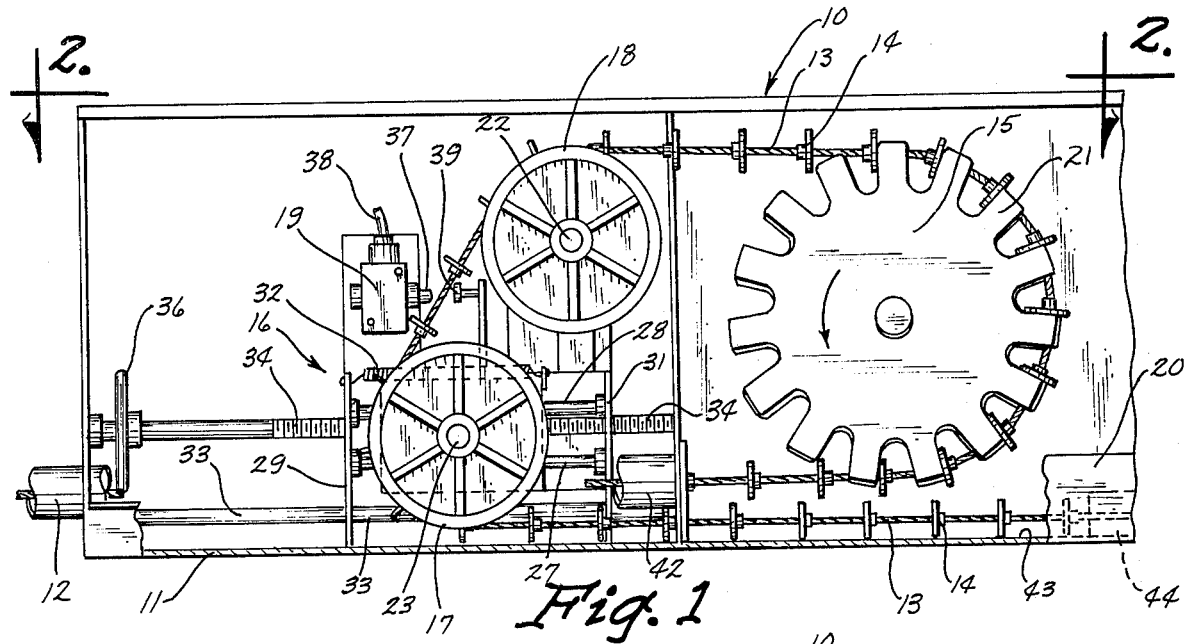
FIG. 1 is a front elevational view of the drive apparatus with a small portion thereof cut away.
Figure 2:
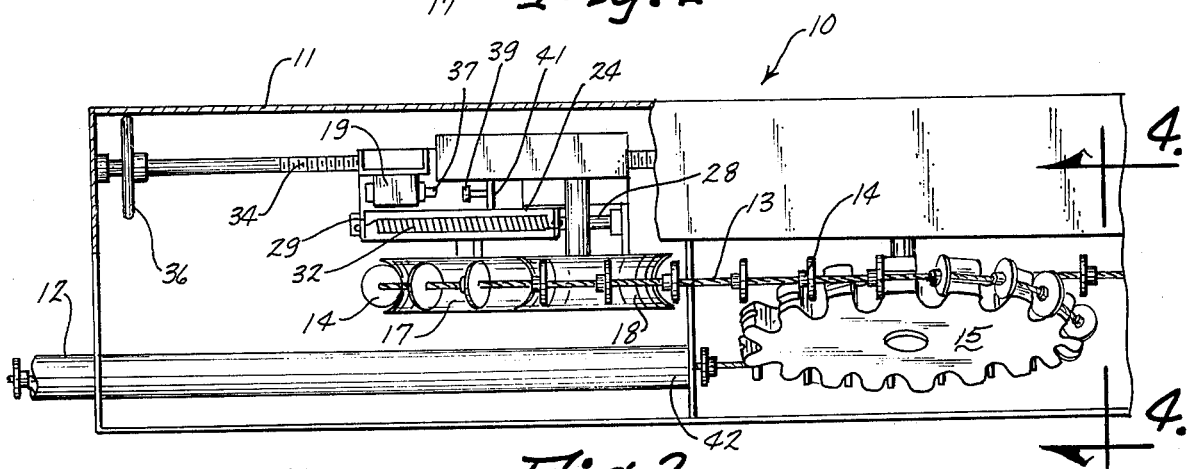
FIG. 2 is a top view of FIG. 1 taken along lines 2—2 with a portion of the housing cut away to expose the cable tension adjusting mechanisms.

Referring now to the drawings, wherein like reference numerals designate identical or corresponding parts throughout the several views, and more particularly to FIG. 1 wherein a drive apparatus 10 is shown. Connected to a housing 11 is a tube 12 which begins at one point on the housing and forms a circuit such that the other end of the tube also is connected to the housing 11. A cable 13 is disposed within the tube 12 and has discs 14 rigidly connected thereto. The cable 13 with the discs 14 thereon are driven through the tube 12 by a driven wheel 15. A cable tension adjusting mechanism 16 including pulleys 17 and 18, have the cable 13 wrapped therearound in a loop-like fashion. A shut-off switch 19 is associated with the cable tension adjusting mechanism to shut off the drive wheel 15 when the tension on cable 13 becomes too loose. A tray 20 is disposed beneath the driven wheel 15 and the cable tension adjusting mechanism 16, to catch any material dropping therefrom.

The driven wheel 15 is powered by an electric motor (not shown), but it is to be understood that wheel 15 can be driven by any other suitable drive means. The driven wheel 15 has slotted projections 21 thereon which engage disc members 14 to move the cable when the driven wheel 15 is turning. This turning movement of driven wheel 15 is preferably in a counterclockwise direction as shown by the arrow in FIG. 1.

The material to be handled, such as livestock feed, is fed into the tube 12 at any point along the line by any suitable means, but preferably by the hopper device of copending application Ser. No. 443,229, filed Feb. 19, 1974. The materials in tube 12 are therefore moved along the tube by movement of cable 13 and disc members 14. Delivery outlets (not shown) are also located at desired positions along the tube 12.

The pulley 18 is pivotally mounted on an axle 22, preferably at a fixed point with respect to the drive apparatus. Pulley 17 is rotatably mounted on an axle 23, which in turn is mounted to a pulley mounting member 24. Pulley mounting member 24 is slideably received on an upper bar 26 and a lower bar 27. These bars 26 and 27 are fastened to a mounting bracket 28 which has end portions 29 and 31. A tension spring 32 connects pulley mounting member 24 to the end 29 of mounting bracket 28, to thereby exert a force upon pulley mounting member 24 towards end portion 29 of mounting bracket 28.

Figure 3:
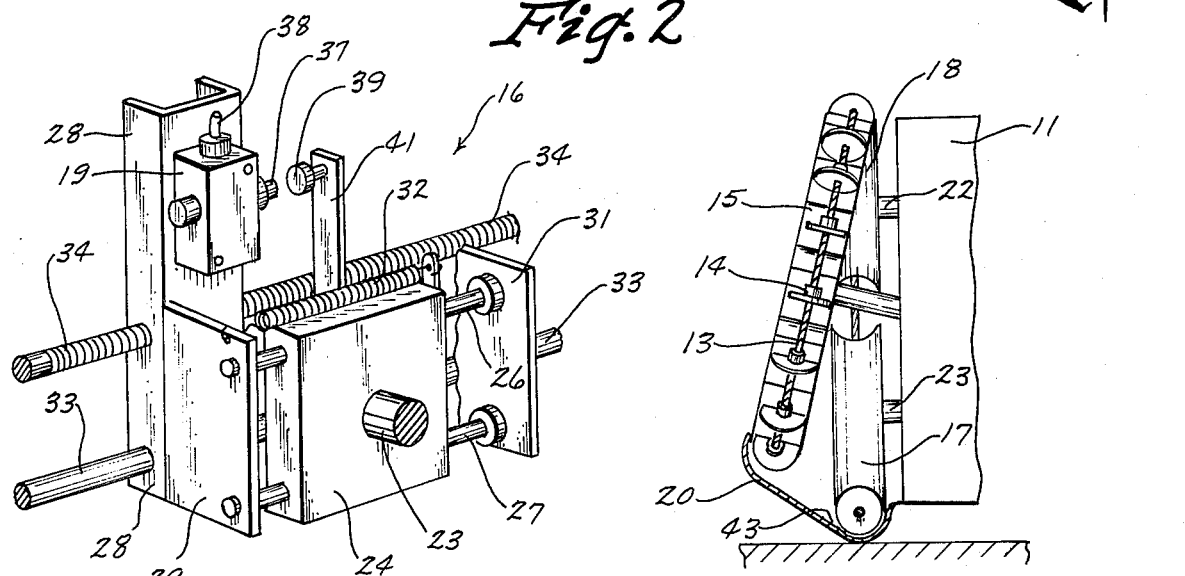
FIG. 3 is a perspective view of the cable tension adjusting mechanisms and shut-off switch as shown in FIGS. 1 and 2.

Mounting bracket 28 is moveably mounted on bars 33 and 34. Rod 33 is smooth and is slideably received within a complimentary opening in mounting bracket 28. Rod 34 has threads thereon which mate with threads in mounting bracket 28, whereby turning of the rod 34 by moving handle 36 will move the mounting bracket and thereby the cable tension adjusting mechanism 16, for example as shown in FIGS. 1 and 3.

The shut-off switch 19 is connected to the mounting bracket 28 of cable tension adjusting mechanism 16, such that when button 37 is depressed, the power is shut off to the electric motor (not shown) through electric lead wire 38. Movement of button 37 is effected by abutment with button member 39 which is rigidly affixed to pulley mounting member 24 by a flat bar member 41 and thereby moves left or right (FIG. 1) as pulley 17 moves left or right.

In the operation of the cable tension adjusting mechanism 16, it will be noted that a loop is formed by cable 13 as it is wrapped around driven member 15 and pulleys 17 and 18. The tightness of the cable 13 tends to pull the moveable pulley 17 towards the right as shown in FIG. 1, while the force of the spring 32 tends to pull the moveable pulley 17 to the left. The force of the tension spring 32 therefore tends to keep the cable 13 tight. If the cable should become loose for any reason, such as because of stretching of the cable 13, the pulley 17, as well as the pulley mounting member 24, button 39 and connecting member 41, will be pulled to the left as shown in FIG. 1 by the force of the spring 32. If this motion to the left is far enough to cause button 39 to depress button 37, the electrical switch 19 will be opened and the power to the drive motor for driven shaft 15 will be shut off. This means that the entire conveyor system will be shut off, so that the looseness of the cable will not cause a malfunction or possibly damage the conveyor system itself. An operator, noticing that the system has been automatically shut off, can then move handle 36 of threaded rod 34 to move the mounting bracket 28 and thereby the entire cable tension adjusting mechanism 16 to the left to achieve the proper tension on cable 13 and re-establish the proper spacing between buttons 37 and 39 of the shut-off switch mechanism 19. The drive apparatus may then be turned on again. It will also be understood, of course, that the entire cable tension adjusting mechanism 16, as best seen in FIG. 3, may be moved to the right by the movement of the handle 36 of threaded rod 34, should the tension on cable 13 be too great, although this function of releaving an excessive tension on cable 13 is normally automatically done by the spring 32, since the forces of the cable tension will pull the moveable pulley 17 to the right along bars 26 and 27 by overcoming the forces of the spring 32. The spring 32 normally has a predetermined initial tension thereon and a predetermined initial length, however, spring 32 may also be of the type having an adjustable tension mechanism thereon. Other types of spring biasing means may also obviously be utilized in this invention.

Figure 4:
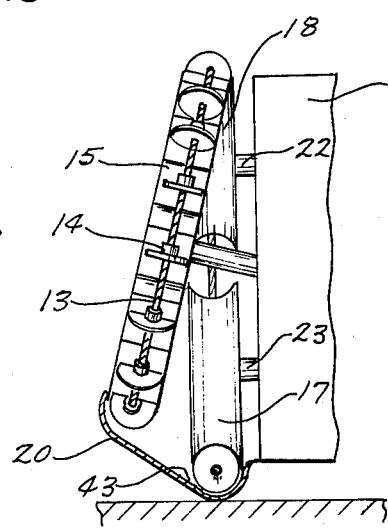
FIG. 4 is a cross-sectional view taken along lines 4—4 of FIG. 2.

Tray 20 is disposed below the driven wheel 15 and the cable tension adjusting mechanism 16. Material in tube 12 which reaches the outlet 42 as shown in FIG. 1, drops down into the bottom 43 of tray 20 (FIG. 4) and is picked up by the movement of cable 13 and disc members 14 along the bottom 43 of the tray 20. The movement of the cable and disc members carries the material back into the tube 12 at inlet 44 (FIG. 1). Additionally, in passing through the tube 12 small particles of the material to be handled tend to collect on the cable 13 and disc members 14. This residual material is carried onto the driven wheel 15 and across the cable tension adjusting mechanism 16, although some material drops immediately into the tray 20. This material also may build up slightly on the driven wheel 15 and pulleys 17 and 18 but it eventually falls into tray 20, which is positioned therebelow to catch this residue. The relative position of the moveable pulley 17 and the tray 20 is important especially with regard to the fact that bottom pulley 17 is the furthest pulley to the left (FIG. 1). Because of this relationship, the system will pick up any residual material dropped into the tray 20. If, for example, top pulley 18 was to be to the left of bottom pulley 17, (FIG. 1), material on pulley 18 could drop down into the tray 20 to the left of pulley 17. This material to the left of bottom pulley 17 therefore would not be picked up by the disc members 14 as they leave the moveable pulley 17 and travel towards the right along the bottom 43 of tray 20.

Obviously many modifications and variations of the present invention are possible in light of the above teachings. It is therefore to be understood, that within the scope of the appended claims, the invention may be practiced otherwise as specifically described.

We claim:

1. A conveyor system having a tube, a continuous cable disposed in the tube, members spaced along and rigidly affixed to said cable, drive means for moving said cable and said members along the inside of said tube, and means for tightening the cable, said means for tightening the cable comprising:

a housing;

a mounting bracket;

means for adjusting the position of said mounting bracket with respect to said housing;

at least one bar connected to said mounting bracket;

a pulley mounting member slideably connected to said bar;

a pulley rotatably mounted on said pulley mounting member and having a portion of the cable around one side thereof and exerting a force against the pulley in one direction; and biasing means connecting said pulley mounting member to said mounting bracket to thereby exert a force opposed to the force exerted by the cable.

2. The apparatus as defined in claim 1 including means for shutting off said drive means when said cable becomes too loose.

3. The apparatus as defined in claim 2 wherein said means for shutting off said drive means comprises a switch means connected to one of said mounting bracket and said pulley mounting member;

a button control means disposed on said switch for turning off the switch;

a button abutting member connected to the other of said mounting bracket and said pulley mounting member whereby when said button abutting member abuts said button, the switch means disengages the drive means.

4. The apparatus as defined in claim 1 wherein said drive means comprises a driven wheel means for engaging and driving said cable and cable members;
   a second pulley engaging said cable and cable members;
   the axes of the pulleys and said driven wheel means generally forming a triangle;
   a portion of said cable being generally in a looped configuration around said pulleys and driven wheel means to thereby tend to keep the cable tight.

5. The apparatus as defined in claim 4 wherein both of said pulleys lie generally in the same plane and said driven wheel means lies generally in a plane lying at an angle with respect to the plane of said pulleys.

6. The apparatus as defined in claim 5 wherein said second pulley is disposed horizontally between the first said pulley and said driven wheel means.

7. The apparatus as defined in claim 6 wherein a tray is disposed beneath said pulleys and driven wheel means to catch material dropping therefrom; and
   a portion of said cable is disposed adjacent the bottom of said tray to thereby pick up the material dropping from said pulleys and driven shaft means and carry such materials into the conveyor system.

8. The apparatus as defined in claim 7 wherein one end of said tube is disposed above said tray whereby when a part of the cable exits said one end, materials in said one end will drop into the tray; and
   the other end of said tube is disposed near the bottom of the tray whereby when the cable enters said other end it will carry the material which has dropped into the tray, into the other end of the tube and thereby back into the conveyor system.

9. The apparatus as defined in claim 1 wherein said means for adjusting the position of said mounting bracket with respect to said housing comprises a threaded rod rotatably mounted to said housing and wherein said mounting bracket is threadedly connected to said threaded rod and movable therealong by rotation of said threaded rod.

10. The apparatus as defined in claim 9 wherein a nonthreaded rod is connected to said housing and is slideably received in an opening in said mounting bracket, whereby said mounting bracket may move along said threaded and non-threaded rods upon rotation of said threaded rod.

11. The apparatus as defined in claim 1 wherein a second bar is connected to said pulley mounting member and said pulley mounting member is slideably mounted on said bar.

12. A conveyor system having a tube, a continuous cable disposed in the tube, members spaced along and affixed to said cable, a housing, drive apparatus connected to the housing for moving said cable and said members inside said tube, and means for tightening the cable, said means for tightening the cable comprising:
   a pulley means mounted to and slidably received on a mounting bracket, said pulley means having a portion of the cable disposed around one side thereof, said cable exerting a force against the pulley in one direction;
   biasing means operably connected between said mounting bracket and said pulley means to thereby exert a force in a direction opposed to the force exerted by the cable whereby the cable is kept tight;
   means for adjusting the position of said mounting bracket with respect to said housing to thereby selectively tighten or loosen said cable, and
   means attached to said mounting bracket for shutting off said drive apparatus when said cable becomes too loose.

* * * * *